United States Patent [19]

McDonough

[11] Patent Number: 4,575,035
[45] Date of Patent: Mar. 11, 1986

[54] MULTIPLE AXIS LINEARLY AND ROTATIONALLY ADJUSTABLE SUPPORT

[76] Inventor: David C. McDonough, 426 S. First St., Dundee, Ill. 60118

[21] Appl. No.: 587,399

[22] Filed: Mar. 8, 1984

[51] Int. Cl.[4] .............................................. E04G 3/00
[52] U.S. Cl. .................................... 248/287; 411/417
[58] Field of Search .............. 248/542, DIG. 13, 285, 248/286, 287; 403/63, 55, 188; 411/417, 418, 419, 420, 421, 422, 119, 121, 122, 123, 124, 469

[56] References Cited

U.S. PATENT DOCUMENTS

| | | | |
|---|---|---|---|
| 1,285,018 | 11/1918 | Bryant | 248/286 X |
| 3,159,074 | 12/1964 | Neuschotz | 411/422 |
| 4,074,537 | 2/1978 | Gronlie | 248/287 X |
| 4,366,940 | 1/1983 | Vargas | 248/542 |
| 4,432,525 | 2/1984 | Duvall | 248/287 |

Primary Examiner—J. Franklin Foss
Assistant Examiner—David L. Talbott
Attorney, Agent, or Firm—Dillis V. Allen

[57] ABSTRACT

A support assembly of general utility that permits linear and rotational adjustability of the article supported including several angularly related hexagonal threaded rods interconnected by support blocks having transversely disposed rod receiving bores therein. The hexagonal configuration of the rods permits the blocks to be angularly located in any of six positions with respect to each rod, and clamping lock nuts threaded on the rods compress the blocks around each rod.

11 Claims, 5 Drawing Figures

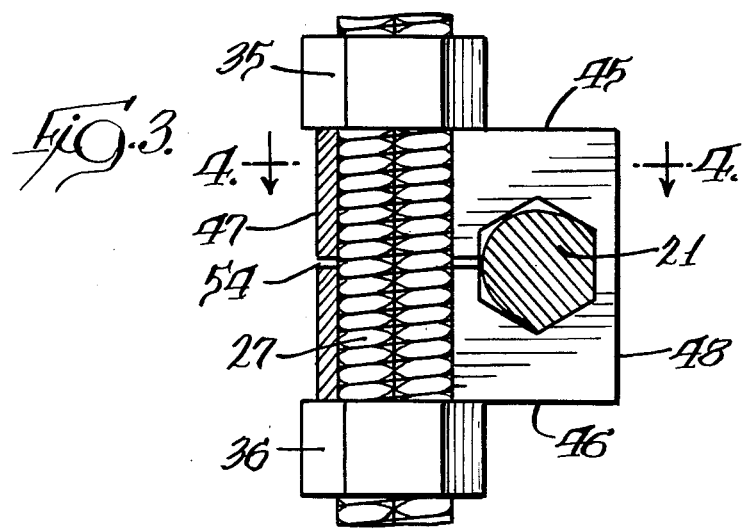
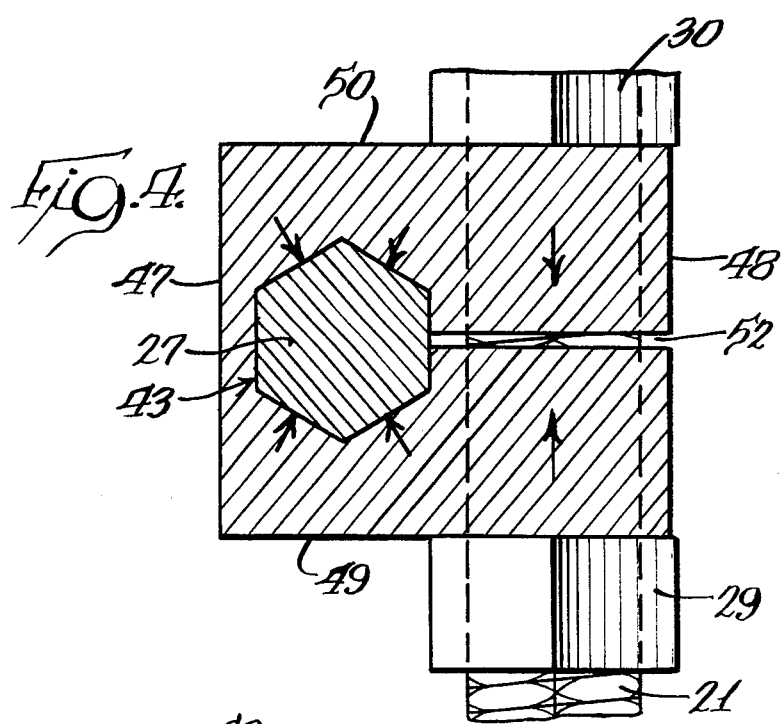
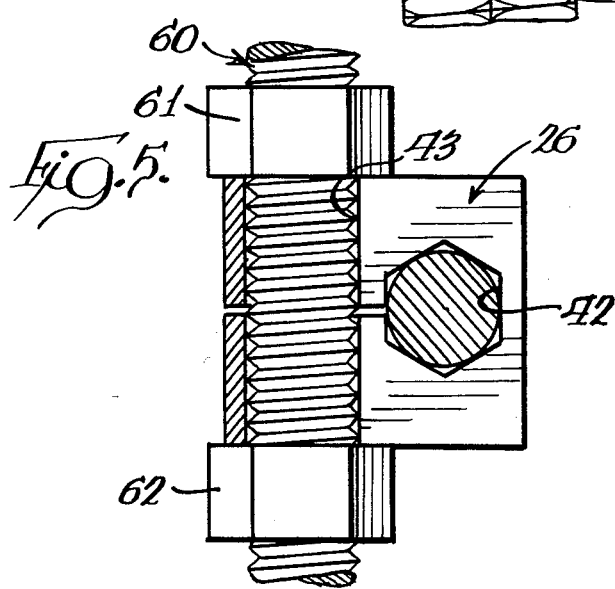

MULTIPLE AXIS LINEARLY AND ROTATIONALLY ADJUSTABLE SUPPORT

BACKGROUND OF THE PRESENT INVENTION

Orthogonally adjustable supports for tools and work holders have been known for many decades and have taken a variety of forms usually dependent upon the loading imposed upon the two axis support and the accuracy of adjustment, if any, required. In the widely used cross slide arrangement for supporting work holders and tools, linearly reciprocable slides are slidably mounted in a dovetail-type groove in a frame and a lead screw rotatably carried by the slide engages a stationary nut member on the relatively fixed frame for the slide. The slide in turn may form the base for a cross slide that also carries a rotatable lead screw threadedly engaging a nut member carried by the first slide.

This cross slide arrangement is suitable for heavy duty load applications and is quite capable, with the appropriate gearing and/or associated servo-mechanisms and controls, of providing accurate positioning of the work or tool supported on the cross slides. However, in many applications this degree of precision in positioning the work or tool is not required and the load supported does not require it.

A variety of linearly adjustable supports such as rod and rod clamp support structures has been suggested in the past for lighter load applications. In this general class of structures a fixed rod is provided and a rod clamp is adjustably positioned on the rod either with a deformable C-lamp or by a set screw arrangement where a set screw threadedly carried by a rod slide frictionally engages the side of the rod. In some cases an additional linearly adjustable rod passes through the clamp itself to gain an additional axis of adjustability for the support.

While the rod clamp supports have found a considerable degree of success for supporting light-load tools and workpieces, and other implements such as lighting, they have not found any great success in supporting medium or heavy-duty tooling workpieces or implements in the industrial environment because of their inability to positively lock either axially or rotationally, and also because of their inability to be adjusted in small increments. These rod clamp support assemblies rely primarily on friction to achieve locking, and hence experience a degradation in performance under higher loads, both linearly and rotationally.

One prior solution to the problem of providing adequate support in intermediate load applications utilizes a square threaded rod with a support member slidably positioned on the rod and located in position by opposed threaded fasteners on the opposite sides of the support member. This square rod and sliding support design, however, has not achieved any significant commercial success because of its inability to accurately locate the block on the rod and to positively lock the fasteners with respect to the square rod.

While the square rod support is satisfactory for some applications, it does not permit adequate clamping of the block on the rod because the block only clamps the rod on two sides, and this results in rod play in a plane transverse to the clamping direction.

A still further disadvantage in the square rod support is that substantial portions of the thread must be cut away, or never formed, to achieve the square configuration and this reduces axial rod strength. Also, the square rod support requires a large support block for a given rod cross-sectional area because of the square configuration of the bores therein.

It is the primary object of the present invention to ameliorate the above problems noted in multiple axis supports for intermediate load tools, workpieces and other implements.

SUMMARY OF THE PRESENT INVENTION

According to the present invention, support is provided for tools, workpieces and other implements that includes a plurality of angularly related hexagonal threaded rods and an interconnecting support block that provides multiple axis linear adjustability and a wide range of rotational adjustability about each axis with improved rod clamping. Toward this end, the present multiple axis support block has rod receiving transverse hexagonal bores extending completely therethrough. A pair of lock nuts are threaded on each rod and abut the sides of the block to axially locate the block with respect to each rod.

This construction provides improved rod clamping and increased rotational adjustability. Toward these ends and according to the present invention a first hexagonal threaded rod is carried by a fixed base and slidably receives the support block through one of the transverse hexagonal bores therein that are slightly larger and complementary to the threaded rods. The block is box-like in configuration and it has two slots, each running transversely through one bore and longitudinally into the other bore. These slots provide resiliency for the block, which is constructed of a low-carbon steel, that assists in performing two functions. Firstly, the block resiliency assists in tensioning the lock nuts in position, and secondly, it enables the block to clamp around the threaded support rods. An important aspect of the present invention is that during this clamping action around the hexagonal rods, the block clamps on four of the six hexagonal surfaces of each rod eliminating rod tilting in the block bores in any longitudinal plane extending through the rod. This is in distinction to square rod clamping blocks that are incapable of eliminating play between the rod and the block in a longitudinal plane extending through the rod in a direction transverse to the clamping force.

The second hexagonal threaded rod is slidably received in the other hexagonal bore in the block and has a fixture or bracket on the end thereof to which the tool, workpiece or implement may be attached. The block is axially adjusted along the first rod and with respect to the second rod by the two lock nuts threaded on each rod that are adapted to engage and abut against opposite sides of the support block. The block is moved axially on each rod by loosening and backing off one of the lock nuts. Thereafter the block is slid down the rod into engagement with the previously located lock nut and the other lock nut is threaded down against the opposite side of the block, positively locating the block in an adjusted position along the rod.

The hexagonal configuration of the threaded support rods provides greatly increased thread strength over the square threaded rod design because the combined or total arcuate length of thread per revolution for a given pitch circle diameter is far greater in the hexagonal rod. A further advantage in the hexagonal threaded rod design is that it permits a smaller block for a given rod cross-sectional area because the transverse bores in the block may be positioned somewhat close together.

BRIEF DESCRIPTION OF THE DRAWINGS

FIG. 3 is a partly fragmentary cross-section taken generally along line 3—3 of FIG. 1 illustrating one of the support blocks;

FIG. 4 is an enlarged cross-section taken generally along line 4—4 of FIG. 3 illustrating the clamping action of one of the hexagonal rods; and FIG. 5 is a cross-section generally similar to FIG. 3 with a round threaded rod substituted for one of the hexagonal rods in the FIGS. 1 to 4 embodiment.

DETAILED DESCRIPTION OF THE PREFERRED EMBODIMENTS

Figure 1:
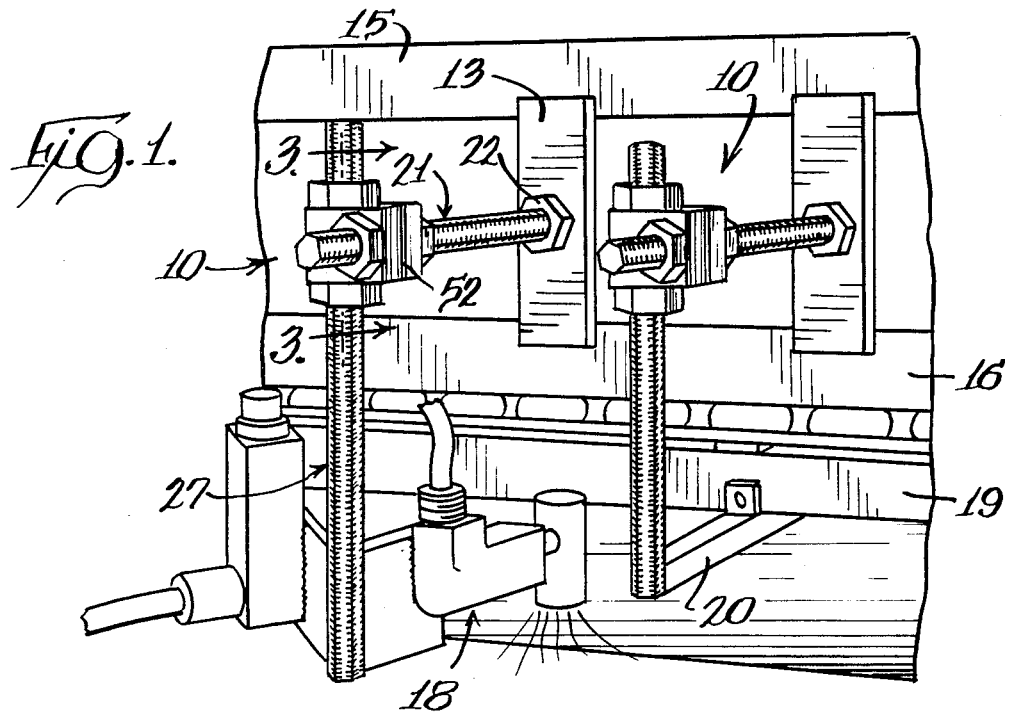
FIG. 1 is a perspective view of a portion of a conveyor line having two linearly and rotationally adjustable supports according to the present invention.

Referring to the drawings and particularly to FIGS. 1 to 4, two dual axis linearly and rotationally adjustable support assemblies 10 and 11 are illustrated, each supported on a fixed steel support plate 13 welded to horizontal side rails 15 and 16 of an industrial conveyor for a paperboard carton setup and loading machine. The support assembly 10 carries a glue gun 18 while the adjustable support assembly 11 carries and adjustably positions a plow fold bar 19 fixed to a cross-member 20 carried by the lower end of support assembly 14.

Insofar as the present invention is concerned the support assemblies 10 and 11 are identical and reference will be made to the support assembly 10 hereinafter with the understanding that it applies to the support assembly 11 as well.

Figure 2:
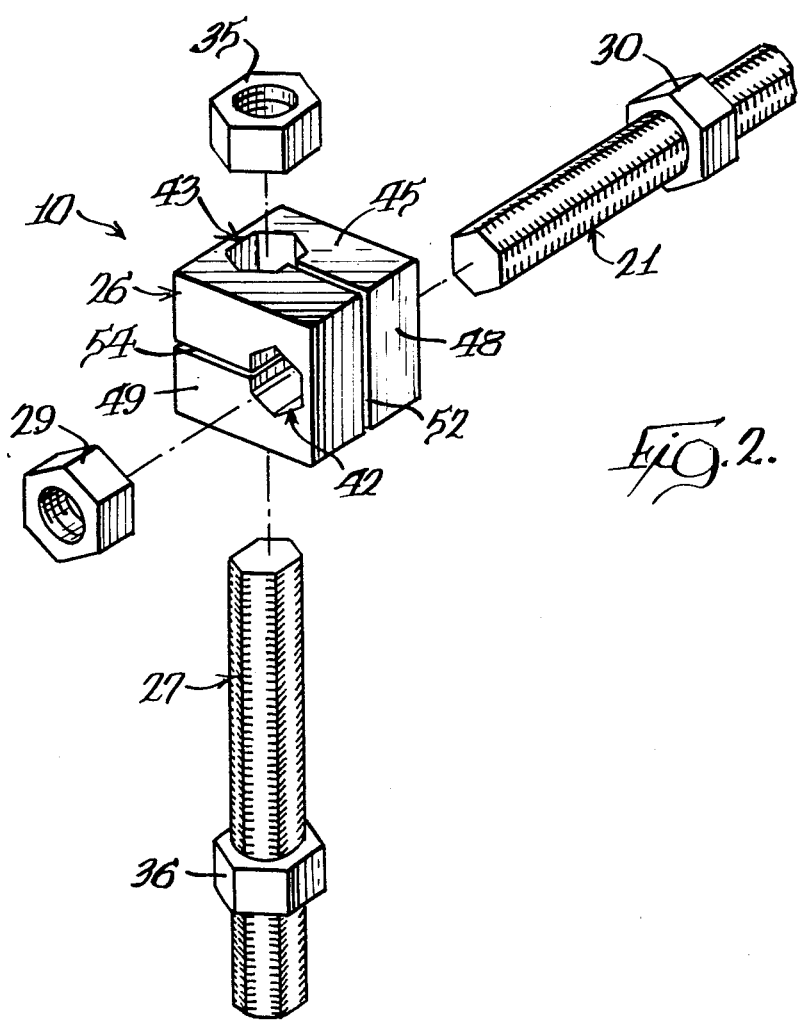
FIG. 2 is an exploded perspective of one of the linearly and rotationally adjustable supports illustrated in FIG. 1 according to the present invention.

As seen in FIGS. 1 and 2, the support assembly 10 includes a horizontal hexagonal threaded rod 21 that is fixed in an aperture in vertical plate 13 by opposed threaded lock nuts 22 engaging the opposite sides of the fixed plate 13.

The two axis adjustable support 10 is seen to generally include a threaded hexagonal rod 21, a generally rectangular support block 26, an adjustable hexagonal threaded support rod 27, lock nuts 29 and 30 adapted to be threaded on rod 21 and clamped against the sides of block 26, and lock nuts 35 and 36 adapted to be threaded on rod 27 and clamped against the upper and lower sides of block 26.

The lock nuts 29, 30, 35 and 36 are hexagonal in configuration and have internal threads complementing the threads on rods 21 and 27.

The block 26 is constructed of a mild steel and has a first hexagonal through-bore 42 parallel but offset from the central horizontal axis of the block 26, and a second vertical hexagonal through-bore 43 that is non-itersecting with bore 42 and parallel to but offset from the vertical central axis of block 26. It should be understood that the terms "vertical" and "horizontal" used to describe the location of the rods 21 and 27 is purely arbitrary and that they may be located in any position desired.

Block 26 has opposed top and bottom walls 45 and 46 interconnected by opposed sidewall pairs 47, 48 and 49, 50. A first slot 52 extends completely vertically across the block from sidewall 48 (in FIGS. 1 and 2), transversely across bore 42 and longitudinally into the bore 43. A second slot 54 extends completely through the block horizontally from sidewall 47, transversely across bore 43, and opens into the longitudinal side of bore 42 as seen in FIG. 3. The slots 52 and 53 provide horizontal and vertical resilience for the block 26 that enables the block to clamp on the rods 21 and 27 and also tension the lock nuts 29, 30, 35 and 36 to maintain them in position.

During assembly, lock nut 30 is threaded on rod 21 until the lock nut is in a position along the rod previously determined and thereafter the block 26 is slid onto the rod 21 and backed up with lock nut 29 until the nut is loosely in engagement with block wall 49. Thereafter, rod 29 which carries with it a suitable tool, workpiece or implement at its distal end, with lock nut 36 previously threaded thereon, is slid through hexagonal bore 43. Lock nut 35 is then threaded down rod 27 until it begins to tighten against upper block surface 45. Lock nut 29 on rod 21 is then tightened against block 26, assuring intimate contact between the lock nuts 29 and 30 and block 26. During this final tensioning or torquing of lock nut 29, block 26 compresses slightly, decreasing the width of slot 42 and clamping the six surfaces defining bore 43 against the hexagonal rod 27. As seen in FIG. 4, four of the six surfaces defining bore 43 clamp against the rod 27 totally eliminating any tilting between the rod and the block 26 in any longitudinal plane extending through the axis of rod 27.

Thereafter lock nut 35 is finally set, compressing the block and partly closing slot 54 to clamp the surfaces defining bore 42 against the rod 21 in the same manner as described above with respect to bore 43. This final torquing of lock nut 35 also axially locates block 26 on rod 27.

The block 26 can be repositioned along either of the rods 21 or 27 in a similar manner. If for example it is desired to move the glue gun horizontally closer to the side rails 15 and 16, as seen in FIG. 1, the lock nut 30 is backed away from block 26 to its new position and then block 26 is slid along rod 21 until it engages the newly positioned lock nut 30. Thereafter, lock nut 29 is threaded against the opposite side of block 26 until fully clamped. Note that while loosening the lock nuts 29 and 30 removes the clamping force on the vertical rod 27, it does not permit any axial or rotational movement of the rod 27 with respect to block 26, and hence it does not affect its position. When the lock nut 29 is reset, the block 26 again clamps rod 27. Rod 27 may be readjusted with respect to the block 26 in the same manner as described with respect to movement of the block 26 along rod 21 so that no repetition in this procedure is believed necessary.

As seen in FIG. 5, the hexagonal configuration of two bores 42 and 43 in block 26, also permits the block to be used with one or two round rods 60. The round rod 60 has an outer diameter equal to the minor outer diameter of the rods 21, 27, i.e. the width of the rods across the flat portions thereof. This of course requires that the rod 60 have a smaller pitch circle diameter and hence smaller lock nuts 61 and 62 with threads equal in size to the threads on rod 60. The use of the one or more of the round rods 60 in the present support assembly is sometimes desirable when the implement supported must have an infinite variety of angular locations with respect to block 26. The six engaging and clamping surfaces of bore 43 on rod 60 eliminate all play between the rod 60 and the block 26 in all directions without causing any significant thread damage.

I claim:

1. A linearly and rotationally adjustable support, comprising: a threaded rod having a hexagonal cross-section, a support member having a bore therein with a hexagonal cross-section defined by six adjacent surfaces complementary to the hexagonal cross-section of the rod and adapted to be slidably mounted on the hexagonal rod in a plurality of angular orientations, means for positively locking the support member axially on the hexagonal rod, and means separate from the means for axially positively locking the support member on the rod for compressing the block in a direction transverse to the bore therein for clamping the support member bore surfaces against at least four of the bore defining surfaces for rotationally positively locking the support member on the rod.

2. A linearly and rotationally adjustable support, as defined in claim 1, wherein the means for locking the support member axially on the hexagonal rod includes a pair of lock nuts threadedly engaging the rod and abutting the sides of the support member.

3. A linearly and rotationally adjustable support as defined in claim 1, wherein the means for compressing the block in a direction transverse to the direction of the bore includes a slot in the support member extending in a plane parallel to the longitudinal axis of the bore, and means for clamping the block in a direction to decrease the size of the slot.

4. A linearly and rotationally adjustable support as defined in claim 1, including a second hexagonal bore in the support member defined by six adjacent surfaces, a second rod slidable in the second bore, means for axially clamping the second rod with respect to the support member, and means for compressing the support member in a direction transverse to the second bore to clamp the support member against the second rod.

5. A linearly and rotationally adjustable support as defined in claim 4, wherein the means for compressing the support member in a direction transverse to the second bore includes a second slot in the support member extending in a plane parallel to the longitudinal axis of the second bore, and means for clamping the support member in a direction transverse to the second bore including said means for axially locking the support member to the first rod.

6. A linearly and rotationally adjustable support as defined in claim 4, wherein the second rod is circular in cross-section.

7. A linearly and rotationally adjustable support as defined in claim 4, wherein the second rod is hexagonal in cross-section.

8. A support assembly that provides at least two axis linear adjustability and rotational adjustability for a supported implement, comprising: a hexagonal threaded rod having one end thereof adapted to be connected to a fixed support, a support block having a hexagonal bore therethrough slidably received on the hexagonal rod, a slot extending from one side of the support block longitudinally intersecting the block bore, a second hexagonal bore extending through the support block generally transverse with respect to the first bore therein, a second slot extending from one side of the support block longitudinally intersecting the second bore, a second threaded rod slideable in the second bore, a first pair of lock nuts threadedly engaging the first threaded rod to axially position the support block on the first rod and also to compress the block second bore around the second rod, and a pair of lock nuts threadedly engaging the second rod and axially positioning the second rod with respect to the support block and also to compress the block first bore against the first rod.

9. A support assembly that provides at least two axis linear adjustability and rotational adjustability for a supported implement as defined in claim 8, wherein the second rod is circular in cross-section.

10. A support assembly that provides at least two axis linear adjustability and rotational adjustability for a supported implement as defined in claim 8, wherein the second rod is hexagonal in cross section.

11. A support assembly that provides at least two axis linear adjustability and rotational adjustability for a supported implement, comprising: a hexagonal threaded rod having one end thereof adapted to be connected to a fixed support, a support block having a first hexagonal bore therethrough slidably received on the hexagonal rod in one of six different rotational positions, a first slot extending from one side of the support block longitudinally intersecting the block bore, a second hexagonal bore extending through the support block generally transverse with respect to the first bore therein, a second slot extending from one side of the support block longitudinally intersecting the second bore, said first slot transversely intersecting the second bore and said second slot transversely intersecting the first bore, a second threaded hexagonal rod slideably mounted in the second bore in one of six different rotational positions, a first pair of lock nuts threadedly engaging the first threaded rod to axially position the support block on the first rod and also to compress the block second bore around the second rod, and a second pair of lock nuts threadedly engaging the second rod and axially positioning the second rod with respect to the support block and also to compress the block first bore against the first rod.

* * * * *